Figure 2:
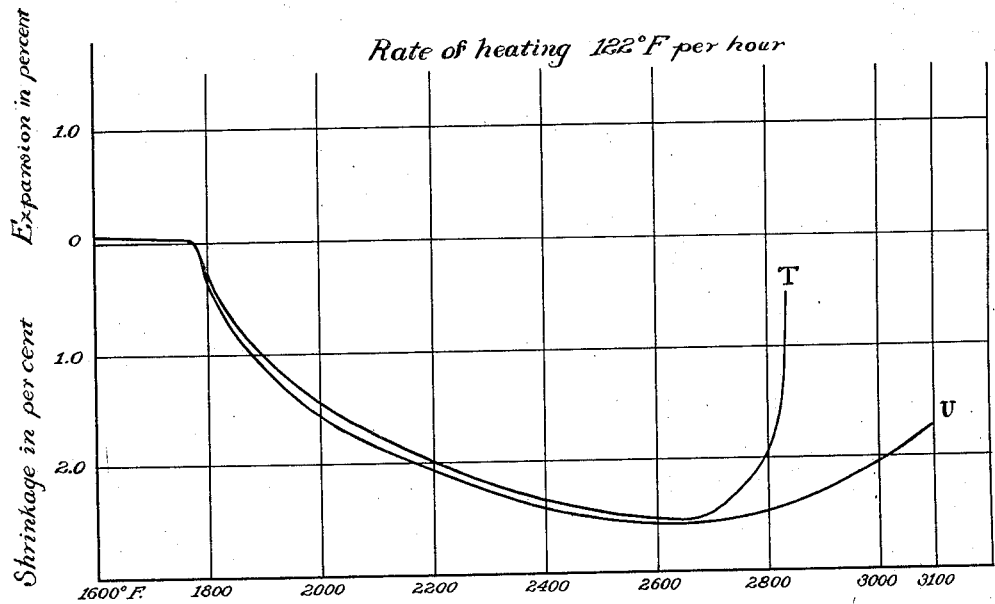

Nov. 5, 1935.  J. M. McKINLEY ET AL  2,019,618
REFRACTORY CERAMIC
Filed Sept. 25, 1933

Inventors;
John M. McKinley,
Willard K. Carter,
By Jones, Addington, Ames & Seibold,
Att'ys Patented Nov. 5, 1935

2,019,618

UNITED STATES PATENT OFFICE 2,019,618

REFRACTORY CERAMIC

John M. McKinley, East Cleveland, and Willard K. Carter, Columbus, Ohio, assignors to National Aluminate Corporation, Chicago, Ill., a corporation of Delaware Application September 25, 1933, Serial No. 690,883

6 Claims. (Cl. 106—11)

The present invention relates to an improvement in the manufacture of refractory ceramic articles such as fire-brick, furnace-lining material and the like, made substantially from argillaceous materials such as clay.

One of the objects of the invention is to improve the green strength of freshly formed or molded dry ceramic articles, to overcome cracking during the drying of the articles, and to enhance the strength of the finished fired products.

Another object of the invention is to decrease the porosity of fire-brick and furnace linings or to enable the production of products of a given density without resorting to raw materials of the usual degree of comminution.

A further object is to permit a wider time and temperature range during the firing of refractory argillaceous products, at the same time bringing about an earlier glass or mineral phase during the firing period.

Still a further object of the invention is to improve generally the physical properties of fire-brick and furnace-lining material by employing in connection with its manufacture a reagent consisting essentially of sodium aluminate, particularly the type known as sodium meta-aluminate, the formula of which is $Na_2Al_2O_4$.

Other objects of the invention will become apparent from the detailed description to follow hereinbelow and from the claims appended to the present specification as well as from an examination of the drawing submitted herewith.

Figure 1:
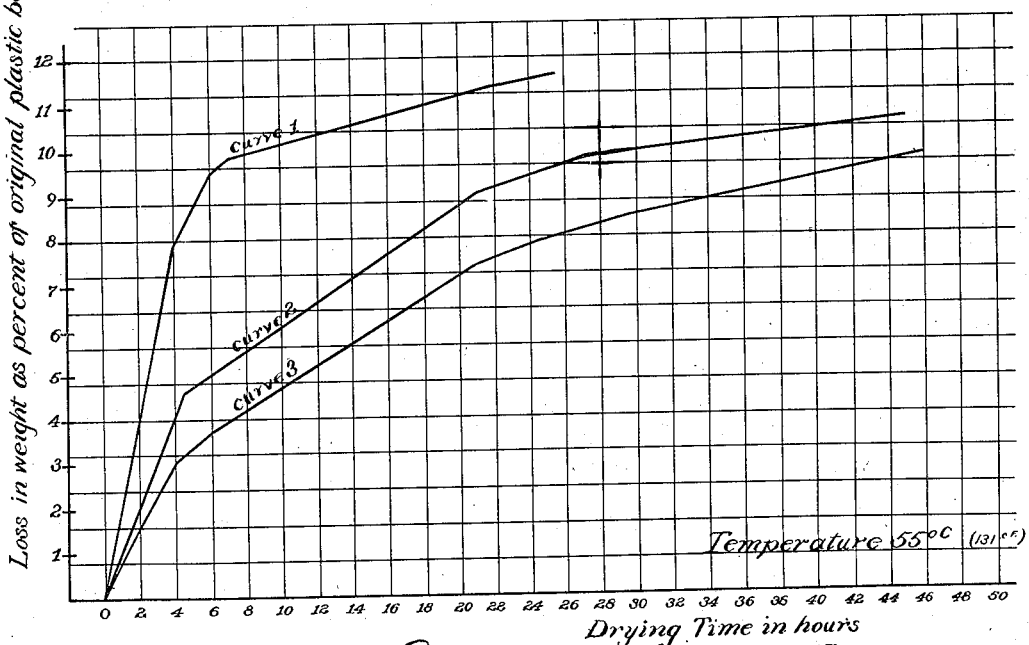

In the drawing, Fig. 1 is a graph showing the drying characteristics of clay refractories made both with and without the addition of sodium aluminate, so that the improvements resulting from the use of this reagent can be better visualized; and Fig. 2 is a graph showing the diminution of the shrinkage on firing argillaceous ceramics when using sodium aluminate therein.

In its simplest embodiment, the invention concerns itself with a process in which sodium aluminate, either dry or in solution, is added to argillaceous raw materials of the type usually employed in the manufacture of refractory ceramic ware, and with the products resulting from the practice of the said process.

This invention relates ultimately to the production of a unique and novel structure in clay ceramic ware, in silica ceramic ware, and in ware which may be composed essentially of clay and silica. This structure, which our invention produces in such wares, contributes novel and desired physical properties to these products and also contributes beneficial results in the nature of an enhancement of the desired physical properties normally possessed by such wares. In addition to the beneficial improvements resulting in the ultimate product, our invention also contributes beneficial results concerning all phases of the manufacturing process, the summation of which results, in the ultimate product, in the production of ware of increased quality, increased specific utility, and increased range of utility.

More specifically, this invention relates to the improvement of wares in which a normal low green strength and great friability contributes to difficulty in processing and results in finished ware lacking, to a greater or less degree, desired qualities.

This invention further relates especially to ware of a composition which normally requires a much higher firing temperature to produce qualities essential to satisfactory utility value than is required by our process.

The process involved in bringing about these improvements consists essentially in the addition of a new and novel ingredient to ceramic mixtures such as are otherwise common and usual to this type of ceramic ware. This material, namely sodium aluminate, having the specified physical properties later enumerated, is mixed with the ceramic mass or mixture in suitable quantities and in such a manner so as to be, for the purposes required, sufficiently therein disseminated. The method of admixture employed may be any which is suitable to the manufacturing process involved, and the quantity added will depend upon the physical properties of the ceramic mass or mixture involved. In the usual practice, the sodium aluminate addition will not comprise more than one-twentieth part of the total weight of the mixture, and in some practice the proportions of this addition may be greatly decreased, and in some practice the proportions of this addition may be greatly increased.

The following, however, composes an absolute essential of the specifications of our invention: The sodium aluminate must be in the form of a compound, fully and completely formed according to the specifications hereinafter given, before admixture with any of the ceramic mixtures or masses in which it is desired to obtain the unique and beneficial results which we have discovered and claim. We have found that in order to obtain these beneficial results there must be a joint and cooperating action of the elements of sodium aluminate, which can only be obtained by adding these elements in the form of the definitely specified compound. The addition of the separate elements of sodium aluminate, either by themselves or combined separately or together with other elements in natural or synthetic combinations, we have proved by long and exhaustive experimentation do not produce the novel and beneficial effects that are obtained by the addition of the hereinafter specified soduim aluminate.

We have further found that the several elementary parts of sodium aluminate act simultaneously to produce the improvements we have discovered, and continued action progresses from the initial introduction of the sodium aluminate to produce a succession of results, each contributing at some stage in the process to the improvements claimed and each of which is essential in a resulting completed product embodying the summation of improvements. We have found that the introduction of the separate constituents of sodium aluminate in other forms may or may not contribute in some degree to producing partial improvements at some stage in the processing, but the properties of the resulting finished product vary definitely from those properties produced by sodium aluminate used as such; and that no other compound or compounds comprised of the separate elements of sodium aluminate, and no other compound and either or any of the separate elements of sodium aluminate, can be introduced into a ceramic mixture or mass such as we are concerned with and result in producing all of the novel and beneficial effects which are produced by sodium aluminate throughout the process of manufacturing or attain the summation of improvements resulting from the introduction of sodium aluminate.

Hence, specifically, our invention consists of the addition of sodium aluminate to ceramic mixtures comprised of clay, silica, or clay and silica and commonly associated ingredients, it being an essential of this invention that the sodium aluminate addition be made in such a manner and in such quantity as to produce thorough mixture and dissemination throughout the ceramic mass or mixture and to produce, to the desired degree, the peculiar structure resulting from sodium aluminate additions to such ceramic mixtures or masses, and that the sodium aluminate comprising such addition shall have the following specified physical properties: It should consist essentially of pure sodium meta-aluminate, $Na_2Al_2O_4$, containing but a slight excess of sodium hydroxide or sodium carbonate. It should be completely or nearly completely soluble in water.

We have found that as a result of the additions of such specified sodium aluminate, our process fully developes the following effects which have been found to be in themselves unique, novel and of great utility, and to contribute, in part or whole, either severally or in combination, to an ultimate product, unique, novel, and of great utility:

(a) Produces controlled coalescence of related grain particles, resulting from a seeming plastic flow produced by the addition of sodium aluminate.

This result is plainly visible in the finished articles, which when polished to a plain surface exhibit a higher gloss and even when examined microscopically show a decided decrease in porosity when compared with similar ceramic ware made from the same raw materials but without the addition of the sodium aluminate.

(b) Diminishes common or usual shrinkage strains.

This is brought out by the slower drying rate. Slower drying allows the material to adjust itself better, thereby avoiding internal strains and stresses. Obviously this will contribute to greater dry strength. Referring for the moment to Fig. 1, which is a graphical representation of the amount of weight lost by the products when dried at 55° C., this shows the percentage of weight lost plotted against time expressed in hours and compares a ceramic mix containing no added sodium aluminate (curve No. 1), 3% sodium aluminate added in the form of a solution thereof in cold water (curve No. 2), and 3% sodium aluminate added in dry form to the moistened argillaceous raw material in accordance with the detailed description and examples which follow hereinbelow. Thus, for example, at the end of four hours, the material without the addition of the sodium aluminate has already lost 8% of moisture, while the material made by adding 3% of sodium aluminate in cold water solution has lost but about 4%, and that with the dry sodium aluminate only about 3%. At the end of 10 hours the percentage loss compares as follows: 10%, 6% and 4.6%, while at the end of 24 hours the first curve shows that the material is practically dry, the second curve shows a loss in weight of 9.5% and the third of 7.9%. Thus, also, it takes about 46 hours for the material made with the sodium aluminate to dry completely. This is, however, an advantage rather than a disadvantage, for this gradual and even drying insures a more homogeneous green ware which has considerably greater strength.

(c) Increased green strength of all wares concerned without lowering the ultimate fusion range of the finished fired articles. In order to prove this point, the following tests were made:

Test A.—4000 grams of a clay known in the ceramic art as "Draucker clay," previously passed through a 30 mesh screen, was mixed with 18% of its weight (720 grams) of distilled water, and the resulting plastic mass was molded into test-bars 6"x1"x1", and these were allowed to dry until in an atmosphere maintained at 50° C. there was no further loss in weight. Simultaneously another portion of the same mass was molded into the shape of pyrometric cones and into 1" cubes. The two latter forms were employed for other tests to be described further on. All of these test pieces, i. e., the bars, cones and cubes, were dried at 50° C. as mentioned.

Test B.—The amount and nature of the ingredients were precisely the same as in Test A except that 40 grams of dry sodium meta-aluminate were mixed with the 720 grams of tempering water which was added to the 4000 grams of clay. The resulting mixture was allowed to stand quietly for 20 minutes after mixing, before being added to the clay, the purpose being to give the sodium aluminate full time to get into equilibrium condition in solution. The same kind of test bars, cones and cubes were made from the resulting clay mass, and these were likewise dried to substantially constant weight at 50° C.

Test C.—The ingredients again consisted of 4000 grams of the "Draucker clay," and 720 grams of tempering water in which there had been dispersed 21.09 grams of very finely ground aluminum oxide ($Al_2O_3$) and 24.36 grams of chemically pure sodium carbonate ($Na_2CO_3$). The amount of these chemicals employed was determined from an analysis of the sodium aluminate employed in Test B to be stoichiometrically equivalent so far as sodium atoms and aluminum atoms are concerned. The mixture of these chemicals with the 720 grams of water was likewise allowed to stand for 20 minutes before being incorporated with the clay. Test bars, cones and cubes were made in exactly the same manner as described in connection with Test A, so that the resulting products would be strictly and accurately comparable.

The following tests were applied to the shapes produced in Tests A, B and C:

1. Transverse strength of green or unfired bars: These were made on a typical cross-breaking machine and are expressed as in terms of the modulus of rupture, in lbs. per sq. inch.

2. Drying shrinkage:—Expressed as per cent. of original.

3. Friability:—Expressed as the number of blows of a 250 gr. weight falling 5 cm., which were required to split the 1" dry unfired cubes.

4. Pyrometric cone equivalent (PCE): Comparison of the fusion values of the small cones formed from the green materials with those of standard cones. Portions of the shapes resulting from each experiment were fired through a period of 48 hours to an ultimate temperature of 1285° C.

The following tests were then applied:

5. Transverse strength of fired bars.
6. Total shrinkage of fired bars.
7. Apparent specific gravity of fired bars.
8. Per cent. porosity of fired bars.
9. Per cent. absorption.

Determinations 7, 8 and 9 were made in accordance with the testing methods described on pages 33 and 34 of "Specifications and Methods of Test for Refractory Materials," published 1932 by the American Society for Testing Materials.

The following results were obtained:

|  | Test A | Test B | Test C |
|---|---|---|---|
|  | No addition of sodium aluminate | With sodium aluminate | With aluminum hydroxide and sodium carbonate |
| Green modulus of rupture | 78.40 | 134.90 | 70.55 |
| Dry shrinkage | 3.0% | 3.5% | 4.0% |
| Friability | 2 and 1 | 3 and 4 | 2 and 1 |
| P. C. E. | Cone 32 | Cone 32–33 | Cone 31–32 |
| Fired modulus of rupture | 1600–2250 | 2027 | 1628 |
| Total shrinkage | 10.0% | 9.0% | 9.0% |
| Fired shrinkage | 7.0% | 5.5% | 5.0% |
| Apparent sp. gr. | 2.592 | 2.606 | 2.599 |
| Per cent. porosity | 28.29 | 24.25 | 26.29 |
| Water absorption | 10.90 | 9.30 | 10.11 |

It will thus be seen that the sodium aluminate addition resulted in a 72.1% increase in dry or green strength, 16.66% increase in drying shrinkage, decrease in friability values, allowing 1 to 2 more impacts, ½ cone or more increase in P. C. E. value, average fired modulus of rupture 25% higher than the minimum obtained with no addition and 8.5% higher than the average obtained with no addition, a decrease in total shrinkage of 10%, a decrease in firing shrinkage of 21% slightly increased apparent specific gravity, 14.2% decrease in the per cent. volume of open pores, and 14.7% decrease in per cent. water absorption.

A similar comparison of values shows that the addition of the equivalent constituents of sodium aluminate (i. e., the aluminum hydroxide and sodium carbonate) resulted in a 10% decrease in dry or green strength, 33.3% in drying shrinkage, equal friability values, ½ cone decrease in P. C. E. value, average fired modulus of rupture approximately equaling the minimum value obtained with no addition, 10% decrease in total shrinkage, 28.5% decrease in firing shrinkage, nearly equal apparent specific gravity, 7.07% decrease in per cent. volume of open pores, and 7.24% decrease in per cent. water absorption. Bars with no addition were badly warped in firing so that fired modulus of rupture values cannot be taken as true values. They arranged between the values given. The other two series gave uniform values throughout the series. Many of the bars of Test C blistered badly on the edges on firing. This was due to soda migration, which, however, was not appreciably evident in the sodium aluminate series, Test B.

Tabulation showing relative increases and decreases in values obtained in Tests B and C as compared with those obtained in Test A

|  | Test B | | Test C | |
|---|---|---|---|---|
|  | Increase | Decrease | Increase | Decrease |
| Green modulus of rupture | 72.1% | | | 10.0% |
| Dry shrinkage | 16.66% | | 33.3% | |
| Friability | | 50–100% | None | None |
| P. C. E. | ½ cone | | | ½ cone |
| Fired modulus of rupture | 8.5–25% | | None | None |
| Total shrinkage | | 10.0% | | 10.0% |
| Fired shrinkage | | 21.0% | | 28.5% |
| Apparent sp. gr. | Slight | | Slight | |
| Per cent. volume open pores | | 14.2% | | 7.07% |
| Per cent. water absorption | | 14.7% | | 7.24% |

(d) Permits increase in grain-size of aggregate without a corresponding increase in porosity.

(e) Permits a decrease of porosity of the fired ware without alteration of the normal grain-size.

Thus, in comparing batches made with and without sodium aluminate, the following results were obtained:

|  | Treated | | Untreated | |
|---|---|---|---|---|
|  | Test Pt | Test Qt | Test Pu | Test Qu |
| Absorption | 16.21% | 16.80% | 22.80% | 22.80% |
| Specific gravity | 2.439 | 2.557 | 2.584 | 2.584 |
| Apparent density | 2.031 | 2.128 | 1.994 | 1.994 |

(f) Produces higher ultimate fusion value as expressed in P. C. E. equivalent. Thus, for example, a commercial batch was made as follows:

40% by weight of a plastic bond clay of the type generally known as "Queens run soft," passed through a 12 mesh screen; 40% by weight of the same, passed through a 20 mesh screen; 20% of "grog," ground so as to permit all to pass through a 12 mesh screen; making 100 parts in all. To this there were added 2 parts of dry sodium aluminate previously dissolved in enough water so that when the resultant solution was added to the above 100 parts of clay and grog there would result a "mud" having the required consistency for hand-molding. This amounted to from 12% to 15% of water by weight, the entire batch thus equaling 116 parts by weight. The mixture was ground in a mixing machine, of the type termed in this art as a wet-pan, until uniform, which required however only a short period of time, such as from four to six minutes, for the grinding operation was merely for the purpose of obtaining a thorough incorporation of the ingredients, as it was not desired to reduce the degree of comminution. The resulting damp mass was hand-molded into shapes and dried at about 150° to 250° F. for from 24 to 72 hours, depending upon the size and shape of the particular articles made. The dried shapes were then set in benches in a Newcastle kiln and fired for seven days at a temperature ranging close to 2000° F.

An entirely similar batch was made, except that the sodium aluminate was omitted. In firing this batch, a slightly higher temperature was carried, i. e., from 2100 to 2300° F., as previous experience with the present invention had demonstrated that the ware containing the sodium aluminate could safely be fired at the lower temperature. This, incidentally, was also an advantage accruing from the use of the sodium aluminate.

When comparing the products made with the sodium aluminate and those made without it, it was found that the former yielded a denser ware. The following table shows the results:

| | Ware with sodium aluminate | Ware without sodium aluminate |
|---|---|---|
| Porosity | 16.8% | 22.8% |
| Specific gravity | 2.557 | 2.584 |
| Apparent density | 2.128 | 1.994 |

In order to exhibit the advantages of sodium aluminate to overcome as far as possible the firing shrinkage, attention is now directed to Fig. 2 and to the following commercially made batches of a refractory patching cement. In order to have material upon which to base a comparison, two exactly similar batches were made, one of these however being without the addition of the sodium aluminate. These two batches were as follows:

| | T Treated with sodium aluminate | U Untreated |
|---|---|---|
| Kentucky grog | 70% | 70% |
| Kentucky semi-hard clay | 20% | 20% |
| Kentucky plastic clay | 10% | 10% |
| Sodium aluminate | 1 part per 100 of the above mixture | None |
| Water | 11-13 parts | 11-13 parts |

The shaping of the material, in actual practice, is of course omitted, as the material is sold in moist condition to be applied to the furnace walls that are to be repaired. For the purposes of this test, however, test bars were formed, dried and fired. Pyrometric cones were likewise prepared and tested. Fig. 2 shows graphically how the treated sample T first showed a firing shrinkage between 1600° F. and about 2660° F. quite comparable to that of the untreated sample U, but then there is a marked change in direction of the curve, so that by the time a temperature of 2840° F. has been reached the total shrinkage, which was over 2½% at 2660° F., has been diminished, by expansion during the intervening temperature range, to 0.5%. At the same temperature, i. e., 2840° F., the untreated sample still showed a shrinkage of 2.5%, and even when the latter sample was fired to 3100° F. it still had a final shrinkage value of 1.7%. This effect can only be explained by the formation of a very definite type of glass phase from the sodium aluminate, probably by its interaction with constituents of the clay, and that this phase by filling up the pores between the particles of the ceramic refractory mass prevents its shrinking any further, and by its own expansion practically equalizes the previous contraction so that the final shrinkage is but 0.5%. This is a great advantage and an entirely unexpected and valuable result. The changes in dimensions are plotted on Fig. 2.

The pyrometric cones made from these same batches of material compared as follows:

Sample T _____P. C. E.=32.5
Sample U _____P. C. E.=31.5 to 32 or an increase from ½ to 1 cone.

(g) The use of sodium aluminate in the clay refractories also gives a product showing a greater resistance to crushing strength while green as well as after firing.

On a strictly comparative basis, samples made with and without varying amounts of added sodium aluminate compare as follows:

| Sodium aluminate added | Crushing strength of fired ware in lbs. per sq. in. |
|---|---|
| None | 46,000 to 56,980 |
| 1% | 93,840 to 108,300 |
| 2% | 91,420 to 123,800 |

It might also be mentioned in this connection that by reason of increased green crushing strength more bricks can be set upon each other in the firing kilns, thus increasing their capacity. In numerical values this compares with a limit of 9 bricks high for untreated ware as against a head as high as 20 for material treated with 1% of sodium aluminate. A further advantage of the increased crushing resistance is that there is less marring evident on the fired bricks, such as is usually caused by indentations made on the lower layers by the weight of the bricks set thereon.

This recital of advantages could be considerably extended, but it is believed that enough has been given in the form of actual determined numerical data to prove beyond peradventure that there are many and outstanding advantages accruing from the incorporation of sodium aluminate with clay in the production of refractory articles therefrom. In connection with the recitation of the above advantages, the formulas given are those of commercially made batches as well as of batches made particularly to determine accurately numerical differences between ordinary refractories made merely from clay and those made with clay and sodium aluminate.

As a still further example, commercial batches were produced in another of the plants available to the inventors, using the following basic proportions:

|   | Parts |
|---|---|
| Calcined Pennsylvania flint clay (grog) | 30 |
| Pennsylvania semi-hard clay | 20 |
| Pennsylvania plastic clay | 10 |
| "Bats" (ground fire-brick) | 40 |

To this was added enough water to yield a plastic mass suitable for hand-molding into firebrick. Besides an untreated batch, batches containing the following additions of sodium aluminate were made and the ware carried through the same operations of forming, drying, and firing, all at the same temperature and general conditions, so that the results are strictly comparable:

| Sodium aluminate added | Porosity | P. C. E. | Spalling test |
|---|---|---|---|
| None | 9.58% | 32.0 | 5 quenchings. |
| ¼% | 9.20 | 32.0 | Not tested. |
| 1% | 9.06 | 32.0 | 12 quenchings. |
| 1½% | 8.90 | 32.0 | Not tested. |

The porosity as well as the spalling tests were carried out strictly in accordance with the directions for making such tests as described in the 1932 edition of "Specifications and Methods of Test for Refractory Materials," of the American Society for Testing Materials. In reporting the spalling tests, the tabulation refers to the time when the first cracking-off of pieces from the test piece occurred after previous heating and quenching. From the above table it will also be apparent that there is a decrease in porosity proportional to the increase in the amount of sodium aluminate added. This is to be expected, and further corroborates the effects observable by visual inspection with the naked eye as well as under magnification.

The present invention is broadly applicable to the various types of argillaceous refractory ware, and it is desired to protect it by Letters Patent in accordance with the subjoined claims:

What is claimed is,

1. The process of producing highly-heat resistant, strong firebrick exhibiting marked decrease in porosity, great crushing strength, resistance to spalling and diminished firing shrinkage, which comprises mixing fire-clay with aggregates and an amount of sodium aluminate substantially equal to from about 1% to about 5% of the weight of the clay, and water to form a plastic mass, forming said mass into shapes, and drying and firing the same.

2. A firebrick comprising substantially 80 parts of clay, 20 parts of previously fired clay, and 2 parts of sodium aluminate.

3. A firebrick or the like comprising 30 parts of flint clay, 20 parts semi-plastic clay, 10 parts plastic clay, 50 parts of ground brick-bats, and from ½ to 1½ parts of sodium aluminate.

4. A firebrick comprising from 90 to 99% of fired clay and from 1 to 2% of fired sodium aluminate.

5. The process of making refractory firebrick which comprises mixing clay with water and from about 1% to 5% of sodium aluminate to form a plastic mass, forming the latter into shape, drying the shaped piece thus produced, and then firing the same at about 2000° F.

6. A firebrick comprising fired clay and from about 1% to about 5% of fired sodium aluminate.

JOHN M. McKINLEY.
WILLARD K. CARTER.